US008171791B2

(12) United States Patent
Sy et al.

(10) Patent No.: US 8,171,791 B2
(45) Date of Patent: May 8, 2012

(54) ROTATION SENSOR WITH ONBOARD POWER GENERATION

(75) Inventors: Williamson Sy, Tokyo (JP); David Bass, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 402 days.

(21) Appl. No.: 12/465,384

(22) Filed: May 13, 2009

(65) Prior Publication Data

US 2010/0288046 A1    Nov. 18, 2010

(51) Int. Cl.
*G01P 15/00* (2006.01)
(52) U.S. Cl. ........................................................ 73/488
(58) Field of Classification Search ...................... 73/488
See application file for complete search history.

(56) References Cited

U.S. PATENT DOCUMENTS

| | | | |
|---|---|---|---|
| 4,510,484 A | 4/1985 | Snyder | |
| 5,473,938 A | 12/1995 | Handfield et al. | |
| 6,535,135 B1 | 3/2003 | French et al. | |
| 6,763,288 B2 | 7/2004 | Caretta et al. | |
| 6,847,126 B2 | 1/2005 | Adamson et al. | |
| 6,959,592 B2 | 11/2005 | Caretta | |
| 6,959,593 B2 | 11/2005 | Mancosu et al. | |
| 7,096,727 B2 | 8/2006 | Adamson et al. | |
| 7,132,939 B2 | 11/2006 | Tyndall et al. | |
| 7,183,937 B2 | 2/2007 | Park et al. | |
| 7,260,984 B2 | 8/2007 | Roundy et al. | |
| 7,341,321 B2 | 3/2008 | Takahashi et al. | |
| 7,549,327 B2 * | 6/2009 | Breed ............................ | 73/146 |
| 7,880,594 B2 * | 2/2011 | Breed et al. ................ | 340/425.5 |
| 2003/0214184 A1 | 11/2003 | Taneyhill | |
| 2004/0211250 A1 | 10/2004 | Adamson et al. | |
| 2004/0267427 A1 | 12/2004 | Suzuki et al. | |

(Continued)

FOREIGN PATENT DOCUMENTS

WO    0002741    1/2000

(Continued)

OTHER PUBLICATIONS

Keck, Marian, "A New Approach of a Piezoelectric Vibration-Based Power Generator to Supply Next Generation Tire Sensor Systems", Department of Micromechanical Systems, Ilmenau Technical University, Germany, 4 pages, IEEE Sensors 2007 Conference.

*Primary Examiner* — Hezron E Williams
*Assistant Examiner* — Rodney T Frank
(74) *Attorney, Agent, or Firm* — Michael Best & Friedrich LLP

(57) ABSTRACT

A rotation sensor configured to be mounted on a rim of a wheel. The rotation sensor includes a band sized and shaped to fit around the rim of the wheel, a first element mounted on the band that generates a first time-varying electrical signal in response to a rotational movement, a second element mounted on the band that generates a second time-varying electrical signal in response to the rotational movement, a processor mounted on the band that receives the first and second time-varying electrical signals and processes the first and second time-varying electrical signals to determine a rotational speed, and a rechargeable power source that receives the first and second time-varying electrical signals, consumes at least a portion of the first and second time-varying electrical signals to recharge the rechargeable power source, and generates a power signal. The processor is connected to the rechargeable power source to receive the power signal.

20 Claims, 6 Drawing Sheets

U.S. PATENT DOCUMENTS

| | | |
|---|---|---|
| 2005/0285569 A1 | 12/2005 | Rao et al. |
| 2005/0285728 A1 | 12/2005 | Tyndall |
| 2006/0176158 A1 | 8/2006 | Fleming |
| 2006/0244581 A1 | 11/2006 | Breed et al. |
| 2007/0095446 A1 | 5/2007 | Mancosu et al. |
| 2007/0174002 A1 | 7/2007 | Kitazaki et al. |
| 2008/0136292 A1 | 6/2008 | Thiesen |

FOREIGN PATENT DOCUMENTS

| | | |
|---|---|---|
| WO | 03051653 | 6/2003 |
| WO | 2006135366 | 12/2006 |
| WO | 2007000781 | 1/2007 |
| WO | 2008012850 | 1/2008 |

* cited by examiner

ROTATION SENSOR WITH ONBOARD POWER GENERATION

BACKGROUND

The present invention relates to rotation sensors. More particularly, the invention relates to rotation sensors that detect wheel rotation, from which the speed of a vehicle can be determined.

Some rotation sensors include components (often targets) in the wheel or wheel rim and other components (that process information from the target) that are located on the chassis. The rotation sensors determine the time it takes for targets to pass the sensor. In some technologies, the angular separation of the targets and the elapsed time is used to determine the speed of the wheel.

SUMMARY

A number of challenges are created by the location of the targets, which are in or on a rotating member (e.g., the wheel), and the sensing elements, which are in or on a non-rotating member (e.g., the chassis). First, since there is relative motion between the components, a simple wired connection between the two can not be used. Either a slip ring (or similar connector) or a wireless connection must be used. Second, in many instances, the placement of the sensor components exposes them to the environment (e.g., water, snow, cold, dirt, dust, stones, rocks, and the like.). The sensor components may also be exposed to heat from the vehicle brakes. A third challenge relates to providing power to the sensor components. Components located on a vehicle chassis can, in many instances, be connected to a vehicle power system. However, providing power to sensor elements located on rotating components is difficult, because, as was noted, a simple wire connection can not be used between a rotating component (e.g., a sensor target) and a stationary component (e.g., the vehicle power system). Currently, many sensor components are battery-powered (by a battery that is separate from the vehicle battery) to avoid having to transmit power from the vehicle power system to the rotating sensor element. To meet the goals of vehicle manufacturers, such elements must operate for 100,000 miles or 10 years. However, many batteries are not capable of meeting this requirement.

To overcome at least some of these disadvantages, the inventors have developed a technology where the rotation sensor is located entirely in the wheel. The rotation sensor includes a rechargeable power source (e.g., conversion equipment and a battery) and an onboard power generator that recharges the storage device. The storage device provides power to a microprocessor and wireless transmitter. The rotation sensor includes no sensing elements that require power. Rather, the rotation sensor includes power-generating elements that generate a voltage or signal when subjected to mechanical deformation, such as bending. The microprocessor receives the signals produced by the power-generating elements. The power generating elements have a dual function and also act as sensing elements. The microprocessor processes the signals from the power-generating elements to determine rotation information. Ultimately, this information is used to determine vehicle speed. The signals from the power-generating devices are also provided to the rechargeable power source.

In one embodiment, the invention provides a rotation sensor configured to be mounted on a rim of a wheel. The rotation sensor includes a band, sized and shaped to fit around the rim of the wheel. A first element, a second element, and a processor are mounted on the band. The first element generates a first time-varying electrical signal in response to a rotational movement. The second element generates a second time-varying electrical signal in response to the rotational movement. The processor receives the first and second time-varying electrical signals and processes them to determine a rotational speed. The rotation sensor also includes a rechargeable power source that receives the first and second time-varying electrical signals. The rechargeable power source consumes at least a portion of the first and second time-varying electrical signals to recharge the rechargeable power source. The power source also outputs a power signal to the processor.

In another embodiment, the invention provides a rotation sensing system for determining a rotational speed of a wheel of a vehicle. The rotation sensing system includes a wheel that rotates with respect to the vehicle, and the wheel includes a rim. The rim is substantially cylindrically shaped with an inner surface and an outer surface, has a substantially circular cross-sectional area, and is operable to rotate about an axis that passes substantially through a center of the substantially circular cross-sectional area. A tire surrounds the rim, and the tire and the rim form an airtight space therebetween. The rotation sensing system also includes a rotation sensor coupled to the outer surface of the rim and positioned in the airtight space. The rotation sensor includes two sensing elements (a first element and a second element). Each element is positioned on the outer surface of the rim and generates a time-varying electrical signal in response to rotation of the wheel. A processor receives the time-varying signals from the elements and processes the time-varying signals to determine the rotational speed. The rotation sensing system also includes a rechargeable power source that provides power to the processor. The rechargeable power source takes the form of or includes a power storage device and receives the first and second time-varying electrical signals to recharge the power storage device.

In another embodiment, the invention provides a method of sensing an angular speed of a wheel of a vehicle. The method includes generating a first time-varying signal with a first element in response to a rotation of the wheel, generating a second time-varying signal with a second element in response to the rotation of the wheel, providing at least one of the first time-varying signal and the second time-varying signal to a rechargeable power source to charge the rechargeable power source, providing the first time-varying signal and the second time-varying signal to a processor, providing a power signal to the processor, and comparing the first time-varying signal and the second time-varying signal to determine a difference between the first time-varying signal and the second time-varying signal, the difference at least partially indicative of a rotational speed of the wheel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
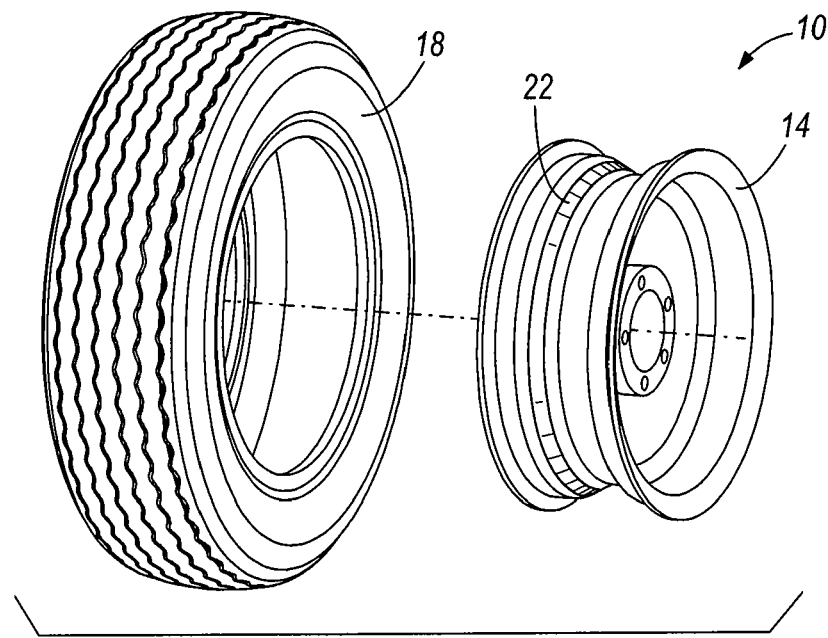
FIG. 1 is an exploded view of a wheel illustrating one mechanism for mounting a rotation sensor on a rim.
Figure 2:
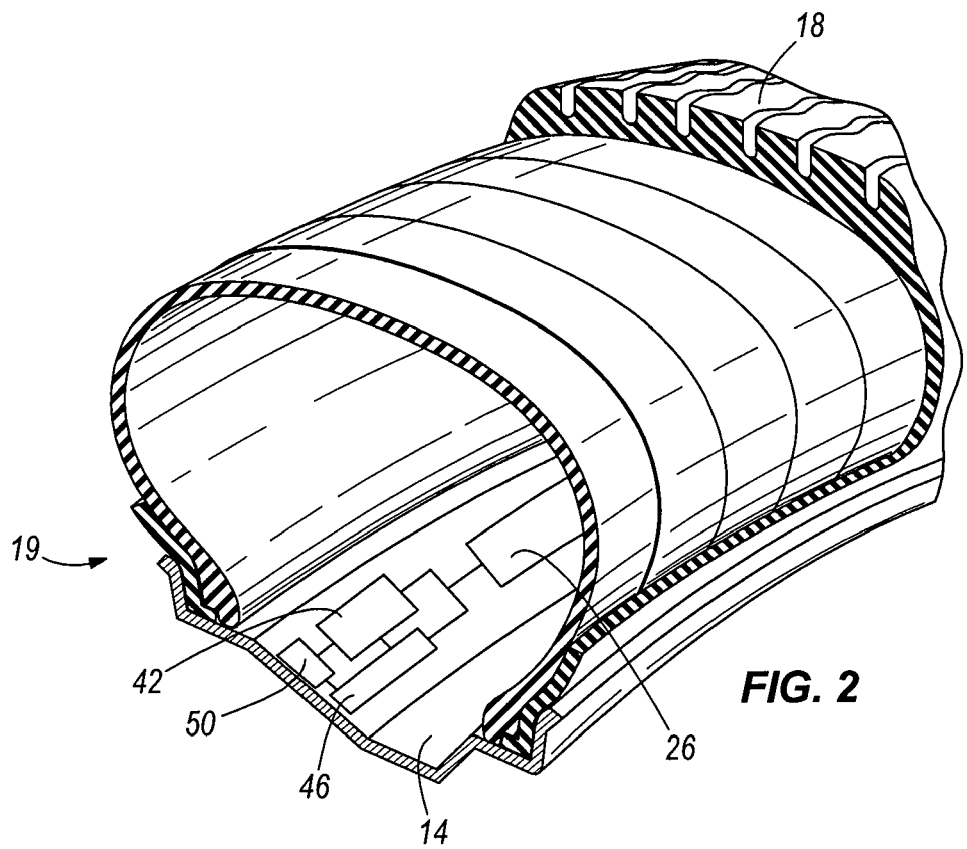
FIG. 2 is a sectional view of the wheel of FIG. 1 and illustrates a rotation sensor.

FIG. 1 is an exploded view of a wheel 10 having a rim 14. The rim 14 is designed to have a tire 18 mounted thereon. When the tire 18 is mounted on the rim 14 a defined, toroidally-shaped space is created between the tire 18 and the rim 14. A rotation sensor 19 is mounted on the rim 14 within the space between the rim 14 and the tire 18. As best seen by reference to FIG. 3, the rotation sensor 19 includes a plurality of sensing elements 26, 30, 34, and 38, a microprocessor 42, a rechargeable power source 46, and a wireless transmitter 50.

Referring back to FIG. 1, the components of the rotation sensor 19 are mounted on a band 22 that is fitted to the rim 14 and secured thereto to substantially prevent movement of the rotation sensor 19 with respect to the rim 14. The band 22 may be formed of an elastic material, metal, plastic, etc. The band 22 may be secured in place by for example, an adhesive, tightening of the band 22 around the rim 14, a combination of both, or other suitable means. In other embodiments, the rotation sensor 19 may not include a band 22 and the components may be mounted directly to the rim 14 via, for example, soldering, adhesive, pins, or other suitable means.

Preferably, the rotation sensor 19 is configured for easy attachment and removal from the rim 14 such as by a band 22 that may be tightened around and loosened from the rim. A suitable band 22 may fasten with, for example, hook-and-loop fasteners or other fasteners that can be tightened or loosed with hand tools. Thus, when the rim 14 and tire 18 are replaced during the lifetime of the vehicle, the rotation sensor 19 may be removed from the rim 14 by loosening the band 22. The band 22 and rotation sensor 19 may then be placed around a new rim and tightened to secure the rotation sensor in position before a new tire is mounted on the rim. Due to the variety of aftermarket rims and tires, which are available in different designs and sizes, a removably mounted rotation sensor 19 is desirable so it can be removed from an original rim 14 and mounted on a desired aftermarket rim.

Figure 3:
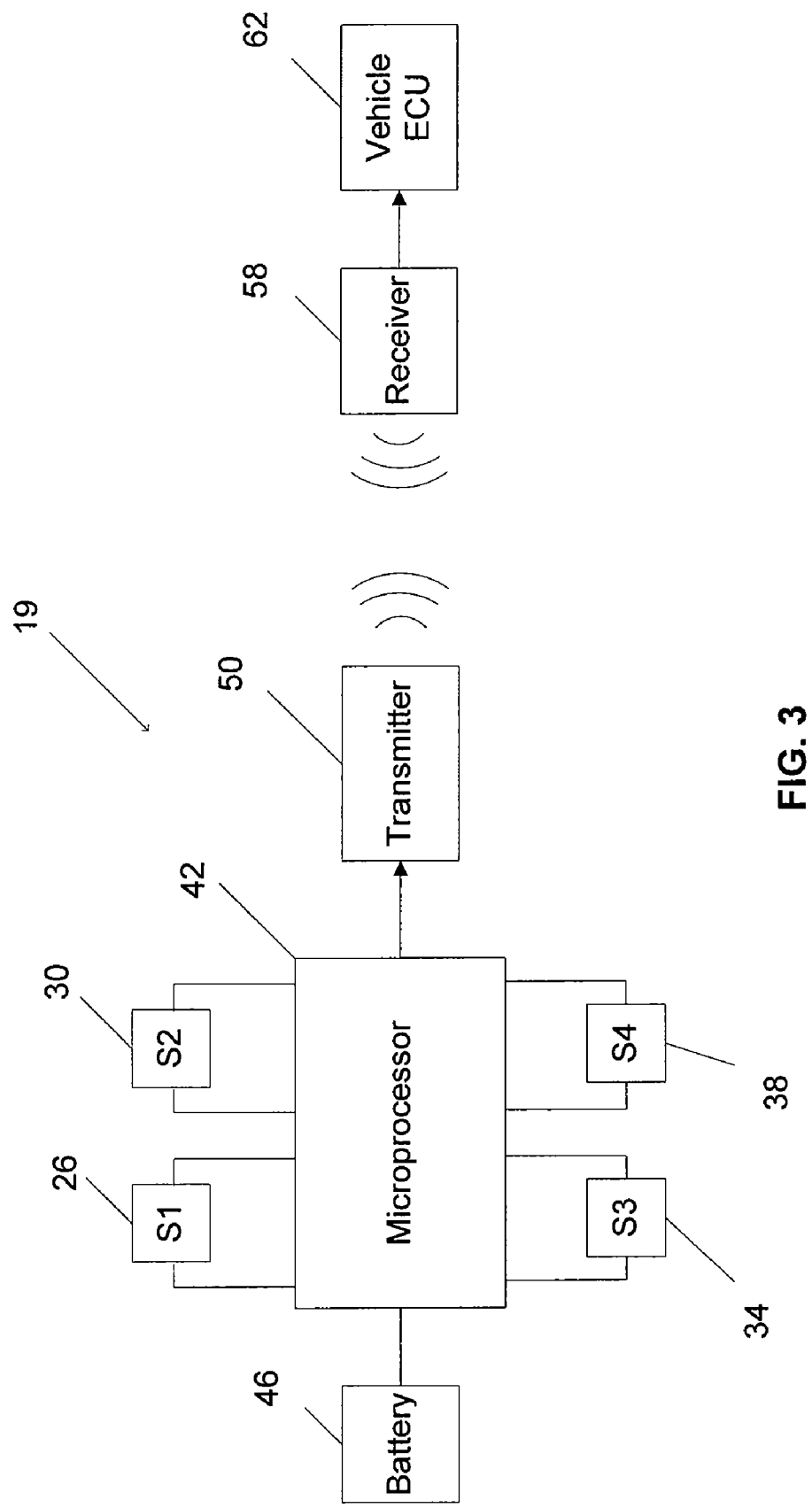
FIG. 3 is a schematic illustrating one embodiment of a circuit for the rotation sensor of FIG. 2.
Figure 5:
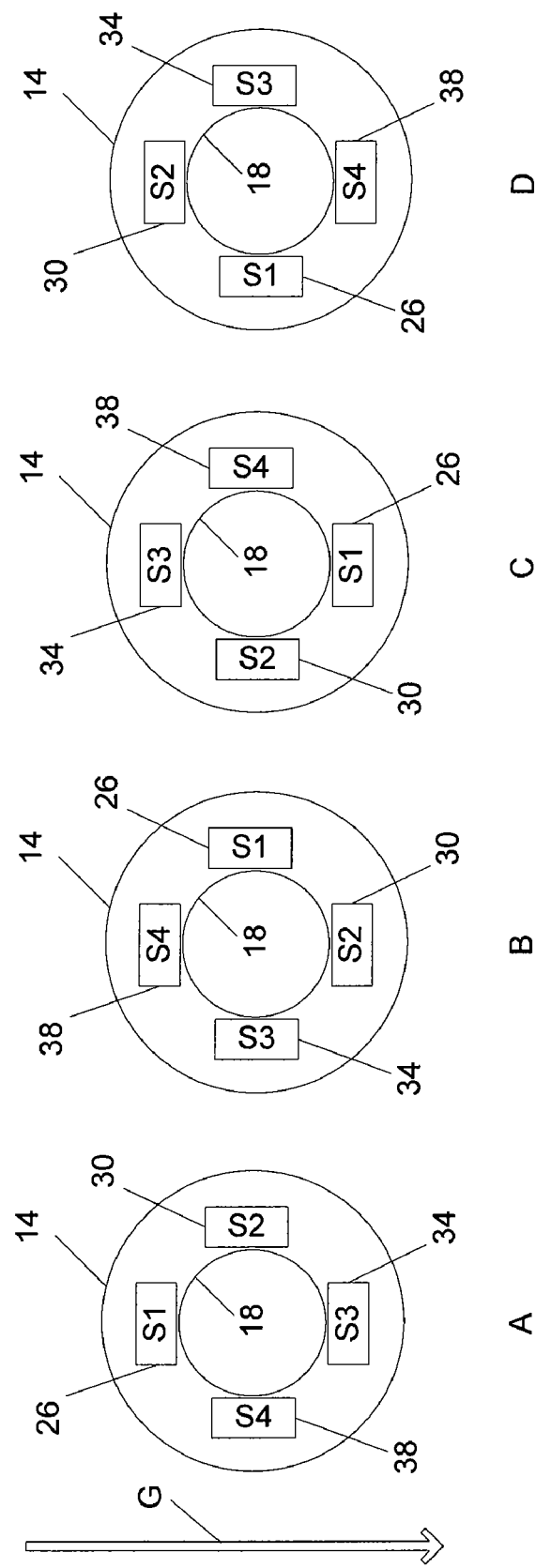
FIG. 5 is a schematic illustrating four possible positions of sensing elements on the rim.

As noted, the rotation sensor 19 includes a plurality of sensing elements and, in the embodiment illustrated in FIG. 3, the sensor includes four elements: 26, 30, 34, and 38. The sensing elements 26, 30, 34, and 38 are piezoelectric elements that produce a voltage when deformed. The magnitude of the voltage varies with the amount of deformation of the piezoelectric element 26, 30, 34, and 38. The polarity of the voltage produced varies with the direction of the deformation. The voltage produced may vary in time if the piezoelectric element 26, 30, 34, and 38 is subjected to deformations that vary in time. Thus, the voltages produced in time may be referred to as an information signal because the time-varying changes may provide information about the rim 14 (such as forces that are acting upon it, as is discussed in greater detail below). In other embodiments, the rotation sensor 19 may include as little as two sensing elements or may include more than four sensing elements. It is preferable that the rotation sensor 19 include an even number of sensing elements positioned opposite each other along the circumference of the rim 14 such that pairs of elements may be identified. For example, as illustrated in FIG. 5, the first sensing element 26 and the third sensing element 34 form one sensing pair and the second sensing element 30 and the fourth sensing element 38 form a second sensing pair.

Figure 6:
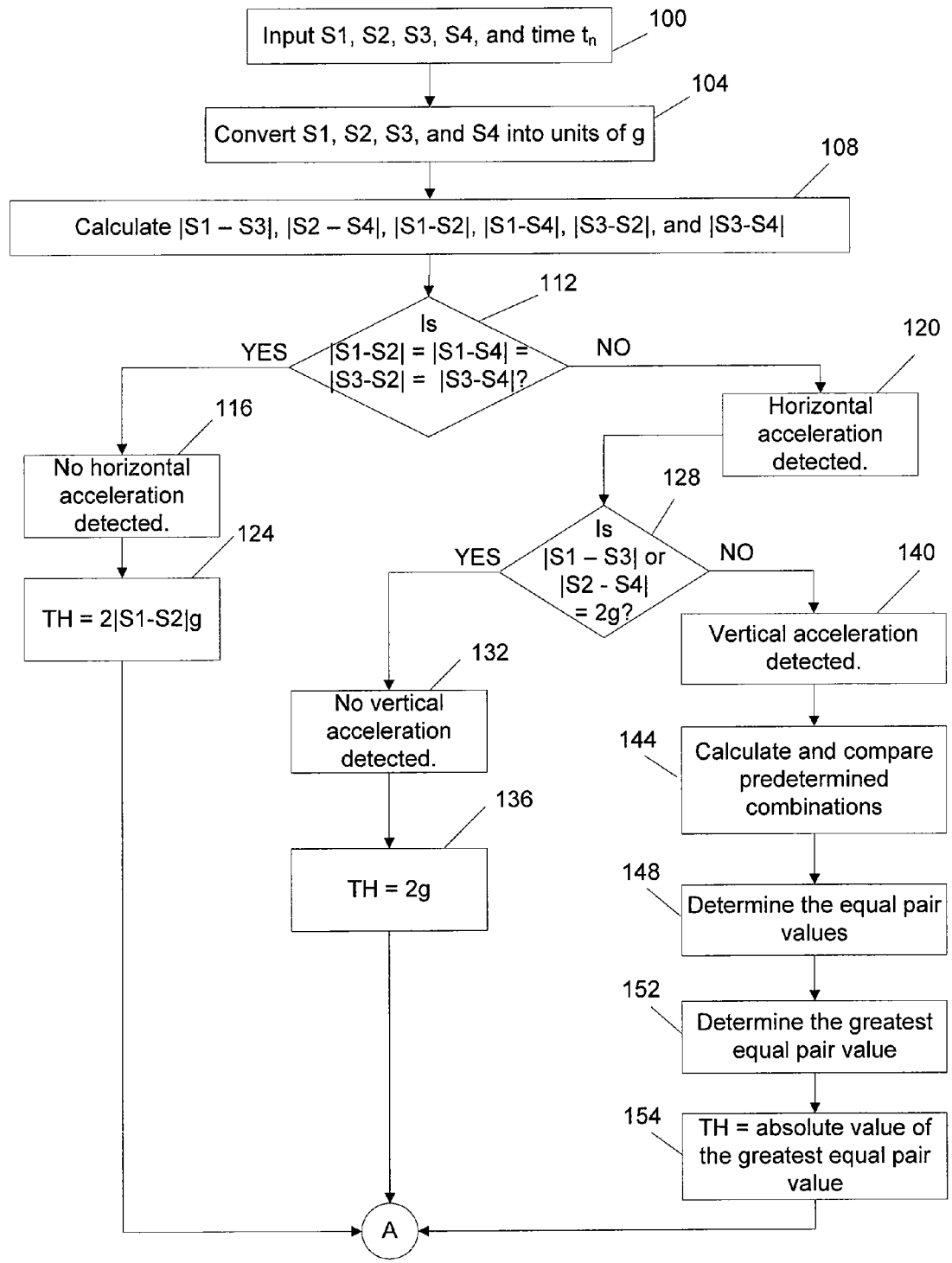
FIG. 6 is a flowchart of one embodiment of logic that a processor may use to process signals received from the sensing elements.
Figure 7:
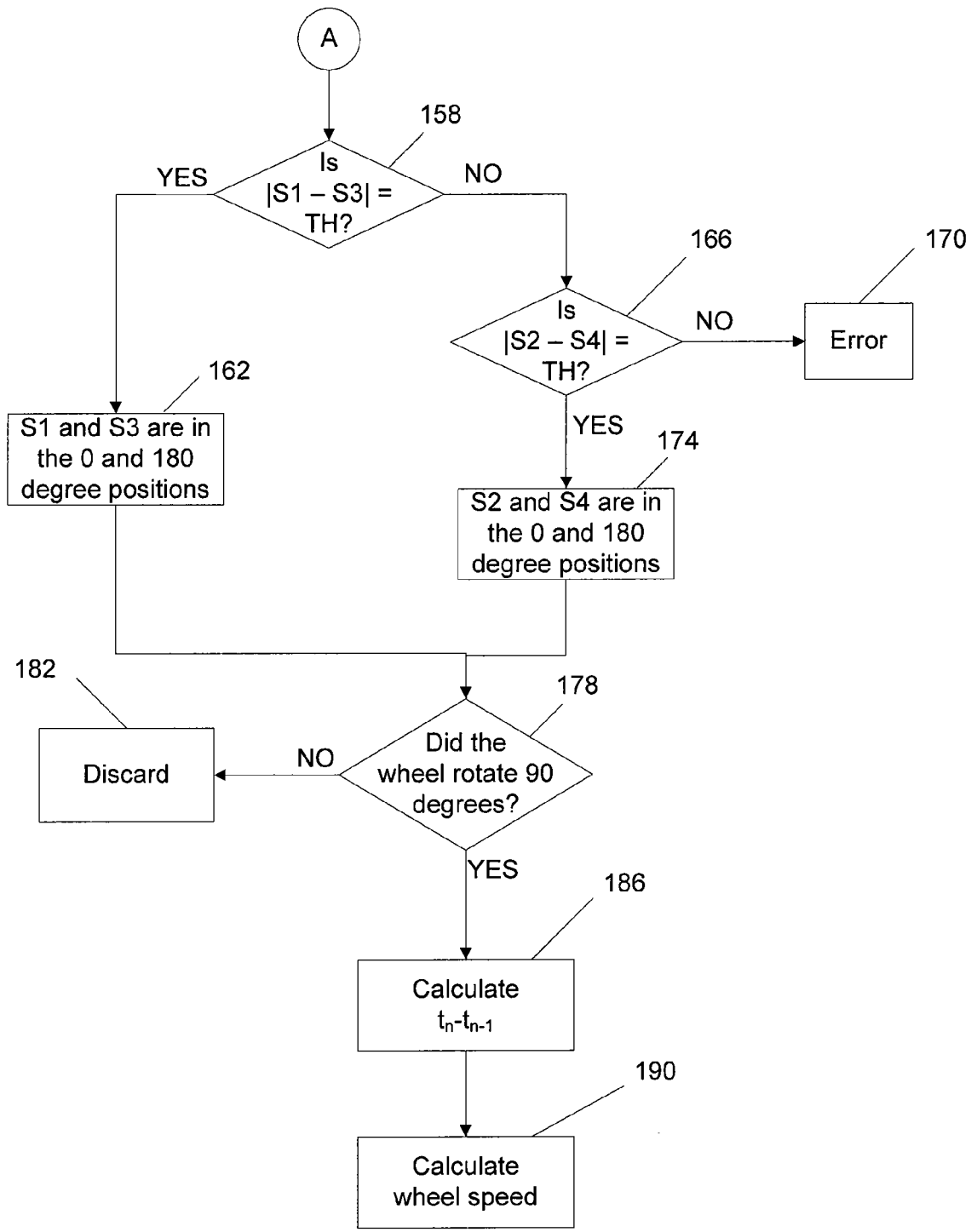
FIG. 7 is a continuation of the flowchart of FIG. 6.

The microprocessor 42 receives and processes information signals from the sensing elements 26, 30, 34, and 38. The microprocessor 42 may process the information signals according to a predefined logic, as illustrated in FIGS. 6-8, to determine information about the wheel 10 that may be used to determine wheel speed. In the present embodiment, the microprocessor 42 determines a wheel speed for every quarter turn (90 degrees of rotation) of the wheel 10.

Figure 4:
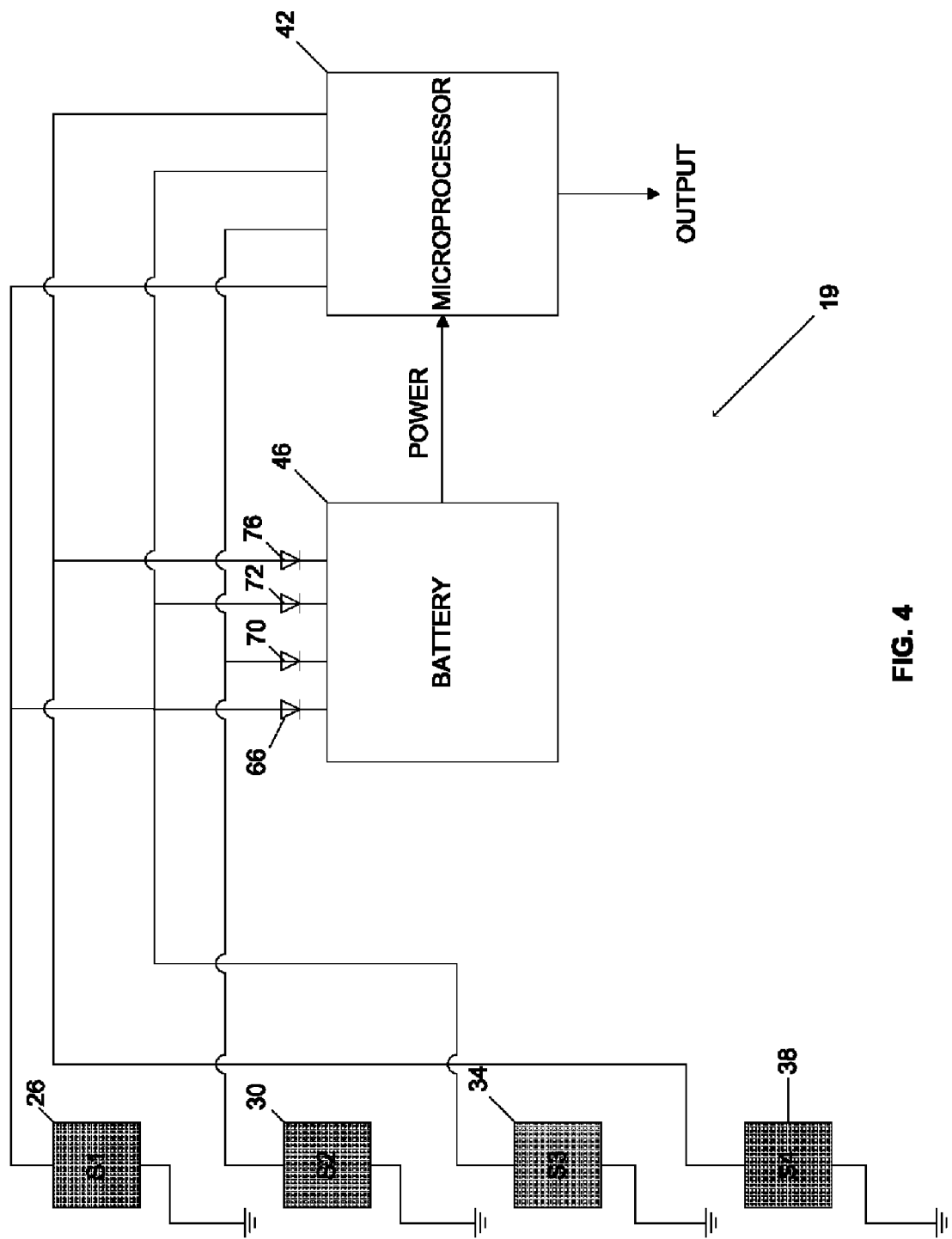
FIG. 4 is a schematic illustrating a second embodiment of a circuit that may be used with the rotation sensor of FIG. 2.

As best seen by reference to FIG. 4, the rechargeable power source 46 (which may take the form of a storage device such as a rechargeable battery) is connected to the microprocessor 42 and provides power to the microprocessor 42. Each sensing element 26, 30, 34, and 38 is connected in parallel across the battery 46 and the microprocessor 42. The battery 46 is configured to receive the signals produced by the sensing elements 26, 30, 34, and 38 and use those signals to recharge the battery 46. In some embodiments, the signals generated by the sensing elements 26, 30, 34, and 38 are processed in a conditioning circuit (e.g., rectifying diodes 66, 70, 72, and 76), as illustrated in FIG. 4, and then provided to the battery 46 as a power signal. Thus, no additional power source is required for the rotation sensor 19 to operate. The battery 46 may be recharged during normal use of the sensor 10.

As illustrated in FIG. 3, the wireless transmitter 50 communicates with a vehicle electronic control unit (ECU) 62 of the vehicle. The microprocessor 42 processes the information signals received from the sensing elements 26, 30, 34, and 38 and determines a wheel speed. The transmitter 50 wirelessly communicates with a receiver 58 to send the wheel speed to the vehicle ECU 62. The ECU 62 may use the wheel speed information in other systems, such as speedometers, vehicle stability control systems, and traction control systems. The transmitter 50 may also transmit the output signal to other devices that require rotation information.

FIG. 5 schematically illustrates placement of the sensing elements 26, 30, 34, and 38 on the rim 14. For convenience, the positions of the sensing elements 26, 30, 34, and 38 will be referred to as 0 degrees, 90 degrees, 180 degrees, and 270 degrees. For example, in position A the first sensing element 26 is at 0 degrees, the second sensing element 30 is at 90 degrees, the third sensing element 34 is at 180 degrees, and the fourth sensing element 38 is at 270 degrees. In position B, the wheel (i.e., tire 18 and rim 14) has rotated 90 degrees clockwise with respect to position A. In position C, the wheel has rotated 180 degrees clockwise with respect to position A. In position D, the wheel has rotated 270 degrees clockwise with respect to position A. Thus, each sensing element 26, 30, 34, and 38 rotates 90 degrees clockwise from position A to position B, from position B to position C, from position C to position D, and from position D to position A.

Signals produced by each sensing element 26, 30, 34, and 38 vary with the position of the sensing element. Gravity acts on the tire 18, rim 14, and sensing elements 26, 30, 34, and 38 in the direction of the arrow G shown FIG. 5. When the wheel 10 is stationary and in position A, the first sensing element 26 is oriented horizontally, whereby gravity bends the first sensing element 26 toward the center of the rim 14, which causes the sensing element 26 to output a positive voltage. The third sensing element 34, also oriented horizontally, bends away from the center of the rim 14 due to the force of gravity and outputs a negative voltage. The second and fourth sensing elements 30 and 38 output substantially zero voltage because the second and fourth sensing elements 30, 38 are oriented vertically and the force of gravity does not cause either the second or fourth sensing elements 30 and 38 to bend.

As the wheel 10 turns, the sensing elements 26, 30, 34, and 38 are positioned as shown in position B of FIG. 5. In this position, the fourth sensing element 38 outputs a positive voltage, the second sensing element 30 outputs a negative voltage, and the first and third sensing elements 26, 34 output substantially zero voltage. Similarly, when the wheel 10 turns another 90 degrees, the sensing elements 26, 30, 34, and 38 are positioned as shown in position C, and after another 90 degrees, the sensing elements 26, 30, 34, and 38 are positioned as shown in position D. In general (and when considering gravity alone), the sensing element in the 0 degree position outputs a positive voltage, the sensing element in the 180 degree position outputs a negative voltage, and the sensing elements in the 90 degree and 270 degree positions output a substantially zero voltage. Thus, as the wheel 10 rotates, the outputs of the sensing elements 26, 30, 34, and 38 change. As discussed in greater detail below, forces other than gravity may act on the sensing elements 26, 30, 34, and 38.

During rotation of the wheel 10, centrifugal forces are exerted on the sensing elements 26, 30, 34, and 38, changing the outputs of the sensing elements 26, 30, 34, and 38. During driving, other events may cause other forces to be exerted on the sensing elements 26, 30, 34, and 38. The forces may be generated as a result of traveling over bumps, braking, acceleration, collisions, etc. As will be discussed below, these events affect the information signals received by the microprocessor 42 and are accounted for during the processing of the signals.

FIGS. 6 and 7 illustrate one example of logic used by the microprocessor 42 to determine wheel speed in rotations per minute (rpm) from the signals received from the sensing elements 26, 30, 34, and 38. In general, the microprocessor 42 detects 90 degree increments of rim 14 rotation and an associated elapsed time in seconds (sec). From that information, the microprocessor 42 calculates wheel speed using the following equation:

$$\text{Wheel Speed (rpm)} = \frac{60}{4(\text{Elapsed Time (sec)})} \quad \text{Equation 1}$$

For simplicity, the output voltage due to gravity that is produced by a sensing element oriented in the 0 degree position is assigned an arbitrary value of +1 g, and the output voltage due to gravity that is produced by a sensing element oriented in the 180 degree position is assigned an arbitrary value of −1 g. Sensing elements positioned in the 90 and 270 degree positions output voltages due to gravity that are assigned values of 0 g. Centrifugal forces due to the turning of the wheel are applied substantially evenly, in a radially outward direction, on the sensing elements as the wheel 10 rotates and cause the sensing elements to each output a more negative voltage.

FIGS. 6 and 7 illustrate the logic used by the microprocessor 42. Of course, in other embodiments, the microprocessor 42 can use a different logic. The logic illustrated in FIGS. 6 and 7 is used for exemplary purposes and is not intended to limit the present invention.

At block or step 100 of FIG. 6, the microprocessor 42 receives the information signals corresponding to the sensing elements 26, 30, 34, and 38 and records a current time $t_n$ when the information is received. The current time $t_n$ corresponds to an internal clock of the microprocessor 42.

At block or step 104, the microprocessor 42 converts the information signals corresponding to the sensing elements 26, 30, 34, and 38 into values S1, S2, S3, and S4, respectively, wherein each value has a unit of g. Thus, S1 represents the information signal corresponding to sensing element 26 in units of g, S2 represents the information signal corresponding to sensing element 30 in units of g, S3 represents the information signal corresponding to sensing element 34 in units of g, and S4 represents the information signal corresponding to sensing element 38 in units of g.

There are six possible pairs that can be formed from the values S1, S2, S3, and S4. The absolute values of the differences between the values of each pair are calculated at block or step 108 and include |S1-S3|, |S2-S4|, |S1-S2|, |S1-S4|, |S3-S2|, and |S3-S4|. The absolute values can be subdivided into a first and second group. The first group includes the values that correspond to sensors positioned opposite each other, or 180 degrees apart. Thus, the first group includes the absolute values |S1-S3| and |S2-S4|. The second group includes the other pairs of values, namely, the absolute values |S1-S2|, |S1-S4|, |S3-S2|, and |S3-S4|.

It was empirically determined that at a point in time, the absolute values in the second group are all equal to each other when there is no horizontal acceleration of the wheel 10. However, when the wheel 10 experiences horizontal acceleration, the absolute values in the second group are not all equal to each other. More specifically, the values |S1-S2| and |S3-S4| are equal to each other, and the values |S1-S4| and |S2-S3| are equal to each other but different from the values of |S1-S2| and |S3-S4|. Thus, the absolute values of the second group |S1-S2|, |S1-S4|, |S3-S2|, and |S3-S4| are compared to each other at block or step 112 to determine if horizontal acceleration is present (block or step 116) or absent (block or step 120). When the wheel 10 does not experience horizontal acceleration, the microprocessor 42 defines a threshold TH as 2|S1-S2|g.

When the wheel 10 experiences horizontal acceleration, without experiencing any vertical acceleration, then there is no effect on the values corresponding to the sensors positioned in the 0 and 180 degree positions. Thus, the absolute difference between the values corresponding to the sensors positioned in the 0 and 180 degree positions is equal to 2 g. For example, when the rotation sensor 19 is orientated as shown in position A of FIG. 3 and assuming each sensing element 26, 30, 34, and 38 experiences a centrifugal force in units of g (Cg), the microprocessor 42 converts the information signals into (1−C)g for the first sensing element 26, and (−1−C)g for the third sensing element 34 at block or step 104. Then, the absolute value of the difference between the first sensing element 26 and the third sensing element 34 is equal to |S1-S3|=|(1−C)g−(−1−C)g|=2 g. Regardless of the amount of centrifugal force Cg experienced by each of the sensing elements 26, 30, 34, and 38, the absolute difference between the sensing elements positioned in the 0 and 180 degree positions is substantially equal to 2 g.

However, when the wheel 10 experiences both horizontal and vertical acceleration, all of the values S1, S2, S3, and S4 are affected and the values corresponding to the sensors positioned in the 0 and 180 degree positions are not equal to 2 g. Thus, at block or step 128, the microprocessor 42 compares the values in the first group to determine the presence or absence of vertical motion. Specifically, the microprocessor 42 determines if |S1-S3|=2 g or if |S2-S4|=2 g (block or step 128). When no vertical acceleration is detected (block or step 132), the microprocessor 42 defines the threshold TH to be equal to 2 g. When the microprocessor 42 determines that vertical acceleration is present (block or step 140), the microprocessor 42 calculates and compares a predefined set of values to determine an appropriate threshold value.

The predefined set of values was determined empirically and includes the following eight values: 2|S1-S2|±|S2-S4|, 2|S1-S4|±|S2-S4|, 2|S1-S2|±|S1-S3|, 2|S1-S4|±|S1-S3|. The microprocessor 42 identifies equal value pairs from the results, at block or step 144. Of the equal value pairs identified, the microprocessor 42 determines the greatest absolute value (block or step 152) and assigns it to the threshold TH (block or step 154).

At block or step 158, the microprocessor 42 determines if |S1-S3|=TH. If yes, the microprocessor 42 assumes that the sensing element corresponding to S1 and the sensing element corresponding to S3 are positioned in the 0 and 180 degree positions. If no, the microprocessor 42 determines if |S2-S4|=TH (block or step 166). If no, then neither the sensing elements corresponding to the values S1 and S3 nor the sensing elements corresponding to the values S2 and S4 are in the 0 and 180 degree positions. Thus, the microprocessor 42 determines an error and disregards the information signals received. If |S2-S4|=TH, then the microprocessor 42 knows that the sensing elements corresponding to the values S2 and S4 are in the 0 and 180 degree positions.

After the microprocessor 42 determines whether the sensing elements corresponding to the values S1 and S3 are positioned in the 0 and 180 degree positions (block or step 162) or the sensing elements corresponding to the values S2 and S4 are positioned in the 0 and 180 degree positions (block or step 174), the microprocessor 42 determines whether the wheel rotated 90 degrees, as shown at block or step 178. The microprocessor 42 compares the current state to the previous state to determine whether the wheel 10 rotated 90 degrees. If the wheel 10 did not rotate 90 degrees, the data is discarded. If the wheel 10 did rotate 90 degrees, the microprocessor 42 calculates the elapsed time $t_n-t_{n-1}$, where $t_{n-1}$ is the time at which one sensing element pair is in the 0 and 180 degree positions and $t_n$ is the time at which the other sensing element pair is in the 0 and 180 degree positions (block or step 186). The microprocessor 42 uses the elapsed time and Equation 1 to calculate the wheel speed, as shown at block or step 190, for the current time period. The wheel speed is wirelessly transmitted to the vehicle ECU 62 or other vehicle systems, as described above, for further processing.

Thus, the invention provides, among other things, a rotation sensor that determines rotational information about a wheel 10 mounted on a vehicle. Various features and advantages of the invention are set forth in the following claims.

What is claimed is:

1. A rotation sensor configured to be mounted on a rim of a wheel, the rotation sensor comprising:
   a band sized and shaped to fit around the rim of the wheel;
   a first element mounted on the band that generates a first time-varying electrical signal in response to a rotational movement;
   a second element mounted on the band that generates a second time-varying electrical signal in response to the rotational movement;
   a processor mounted on the band that receives the first and second time-varying electrical signals from the first and second elements respectively, and processes the first and second time-varying electrical signals to determine a rotational speed; and
   a rechargeable power source that receives the first and second time-varying electrical signals from the first and second elements respectively, consumes at least a portion of the first and second time-varying electrical signals to recharge the rechargeable power source, and generates a power signal, and
   wherein the processor is connected to the rechargeable power source to receive the power signal.

2. The rotation sensor of claim 1, further including a transmitter that transmits the rotational speed to a second processor.

3. The rotation sensor of claim 1, wherein the first element and the second element are mounted on the band substantially 180 degrees apart and the processor processes the first and second time-varying electrical signals to determine an amount of time for the wheel to rotate 180 degrees.

4. The rotation sensor of claim 1, wherein the first and second elements are piezoelectric elements.

5. The rotation sensor of claim 1, further comprising a third element mounted on the band that produces a third time-varying electrical signal in response to the rotational movement and a fourth element mounted on the band that produces a fourth electrical time-varying signal in response to the rotational movement, and wherein the processor receives the third and fourth time-varying electrical signals and processes the third and fourth time-varying signals to determine the rotational speed.

6. The rotation sensor of claim 5, wherein the first element and the second element are mounted on the band substantially 180 degrees apart, the third element is mounted on the band substantially 90 degrees apart from the first element and 90 degrees from the second element, and the fourth element is mounted on the band substantially 90 degrees apart from the first element, 90 degrees apart from the second element, and 180 degrees from the third element, and wherein the processor processes the first and second time-varying electrical signals and the second and third time-varying electrical signals to determine the rotational speed.

7. The rotation sensor of claim 6, wherein the processor processes the first and second time-varying electrical signals and the third and fourth time-varying electrical signals to determine an occurrence of an acceleration of the wheel.

8. The rotation sensor of claim 6, wherein the processor processes the first and second time-varying electrical signals and the third and fourth time-varying electrical signals to determine an occurrence of a force acting on the wheel due to an acceleration of the wheel.

9. The rotation sensor of claim 5, wherein the rechargeable power source receives the first and second time-varying electrical signals and the third and fourth time-varying electrical signals, consumes at least a portion of the first and second time-varying electrical signals and the third and fourth time-varying electrical signals to recharge the rechargeable power source.

10. A rotation sensing system for determining a rotational speed of a wheel of a vehicle, the rotation sensing system comprising:
   a wheel that rotates with respect to the vehicle, the wheel including:
      a rim that is substantially cylindrically shaped with an inner surface and an outer surface, the rim having a substantially circular cross-sectional area, and the rim operable to rotate about an axis that passes substantially through a center of the substantially circular cross-sectional area; and
      a tire that surrounds the rim, the tire and the rim forming an airtight space therebetween;

a rotation sensor coupled to the outer surface of the rim and positioned in the airtight space, the rotation sensor including:
- a first element positioned on the outer surface of the rim that generates a first time-varying electrical signal as the wheel rotates;
- a second element positioned on the outer surface of the rim substantially opposite the first element that generates a second time-varying electrical signal as the wheel rotates;
- a processor that receives the first time-varying electrical signal from the first element, and the second time-varying electrical signal from the second element, the processor processes the first time-varying signal and the second time-varying signal to determine the rotational speed; and
- a rechargeable power source that provides power to the processor and receives the first time-varying electrical signal from the first element, and the second time-varying electrical signal from the second element, to recharge the rechargeable power source.

11. The rotation sensing system of claim 10, further including a transmitter that transmits the rotational speed to a vehicle control unit.

12. The rotation sensing system of claim 10, wherein the first element, the second element, the processor, and the rechargeable power source are mounted on a band configured to fit around the rim of the wheel, the band removably mounted on the outer surface of the rim.

13. The rotation sensor of claim 10, wherein the first element and the second element are mounted on the rim substantially 180 degrees apart and the processor processes the first and second time-varying electrical signals to determine an amount of time for the wheel to rotate 180 degrees.

14. The rotation sensing system of claim 10, wherein the first element and the second element are piezoelectric elements.

15. The rotation sensing system of claim 10, further comprising
- a third element positioned on the outer surface of the rim between the first element and the second element that generates a third time-varying electrical signal as the wheel rotates, and
- a fourth element positioned on the outer surface of the rim substantially opposite the third element that generates a fourth time-varying electrical signal as the wheel rotates,
- wherein the processor receives the third time-varying electrical signal and the fourth time-varying electrical signal and processes the third and fourth time-varying electrical signals to determine the rotational speed.

16. The rotation sensing system of claim 15, wherein the rechargeable power source receives at least one of the third time-varying electrical signal and the fourth time-varying electrical signal to recharge the rechargeable power source.

17. The rotation sensing system of claim 15, wherein the processor processes the first and second time-varying electrical signals and the third and fourth time-varying electrical signals to determine an occurrence of an acceleration of the wheel in at least one of a horizontal direction and a vertical direction.

18. The rotation sensor of claim 15, wherein the processor processes the first and second time-varying electrical signals and the third and fourth time-varying electrical signals to determine an occurrence of a force acting on the wheel due to an acceleration of the wheel.

19. A method of sensing an angular speed of a wheel of a vehicle, the method comprising:
- generating a first time-varying signal with a first element in response to a rotation of the wheel;
- generating a second time-varying signal with a second element in response to the rotation of the wheel;
- providing at least one of the first time-varying signal from the first element, and the second time-varying signal from the second element, to a rechargeable power source to charge the rechargeable power source;
- providing the first time-varying signal and the second time-varying signal to a processor;
- providing a power signal to the processor from the rechargeable power source; and
- comparing the first time-varying signal and the second time-varying signal to determine a first difference between the first time-varying signal and the second time-varying signal, the first difference at least partially indicative of a rotational speed of the wheel.

20. The method of claim 19, further including
- generating a third time-varying signal with a third element in response to the rotation of the wheel;
- generating a fourth time-varying signal with a fourth element in response to the rotation of the wheel;
- providing at least one of the third time-varying signal and the fourth time-varying signal to the rechargeable power source to charge the rechargeable power source;
- providing the third time-varying signal and the fourth time-varying signal to the processor;
- comparing the third time-varying signal and the fourth time-varying signal to determine a second difference between the third time-varying signal and the fourth time-varying signal, the second difference at least partially indicative of the rotational speed of the wheel; and
- determining the rotational speed of the wheel by processing the first difference and the second difference.

* * * * *